Figure 4:
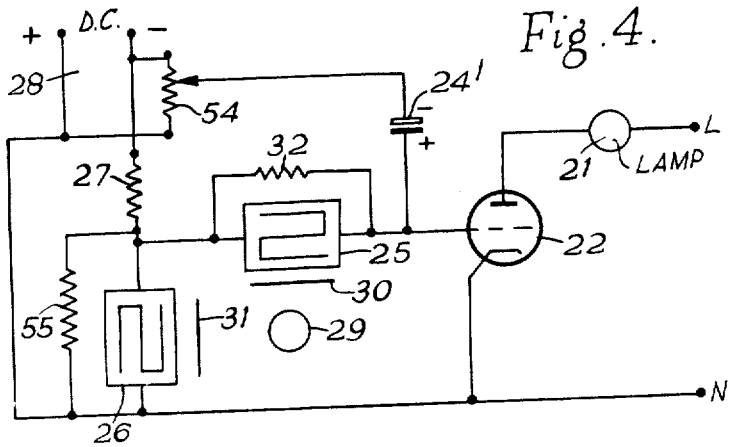

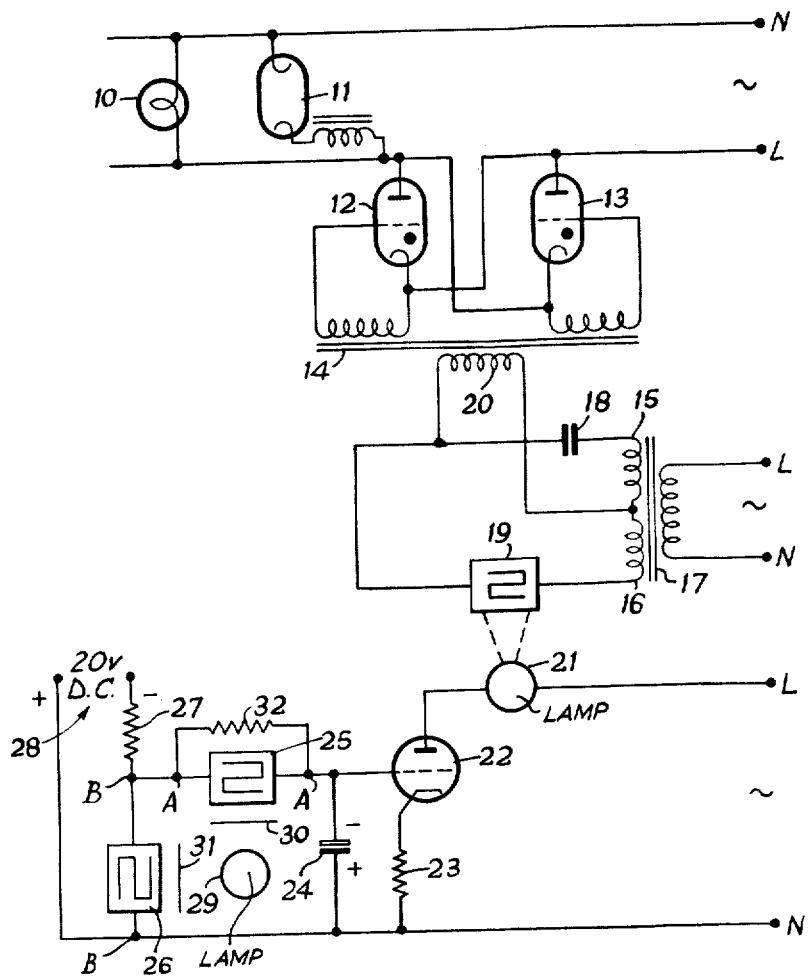

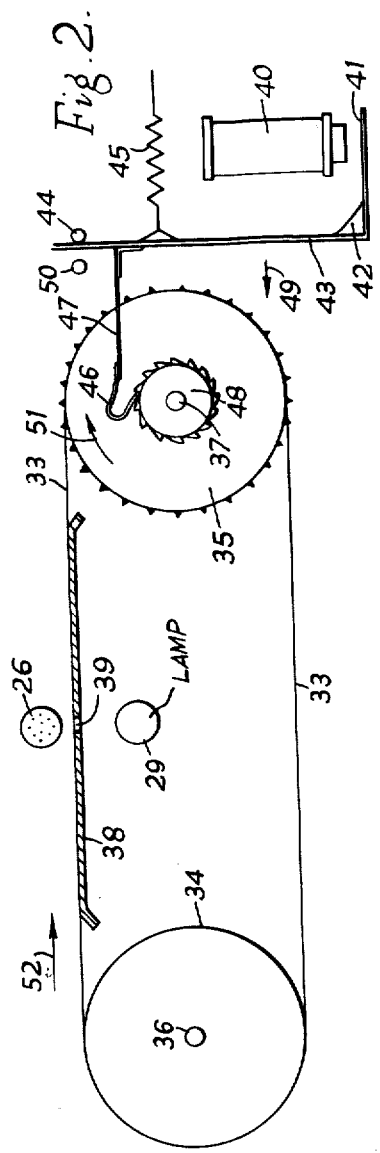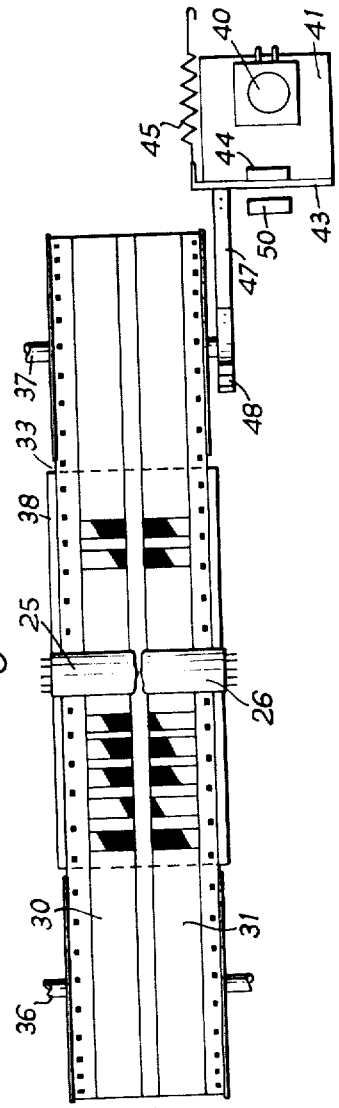

Nov. 17, 1964 C. R. PASSMORE ETAL 3,157,821
CONTROL OF LIGHTING EFFECTS
Filed March 11, 1960 6 Sheets-Sheet 4
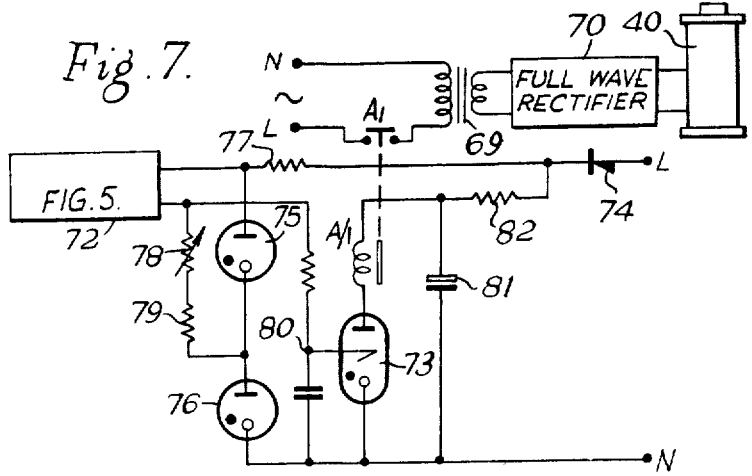
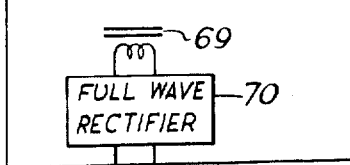
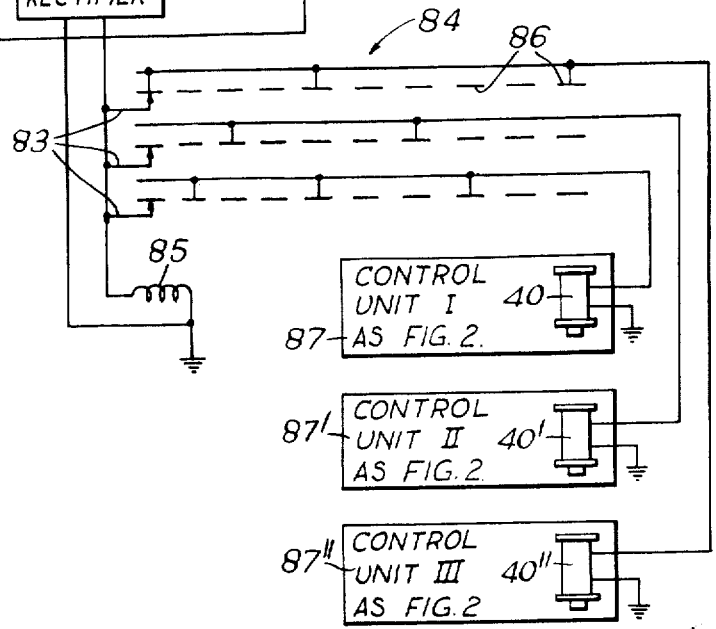
INVENTORS
CHARLES RIVERS PASSMORE
THOMAS WILLIAM SHAW
BY
ATTORNEY

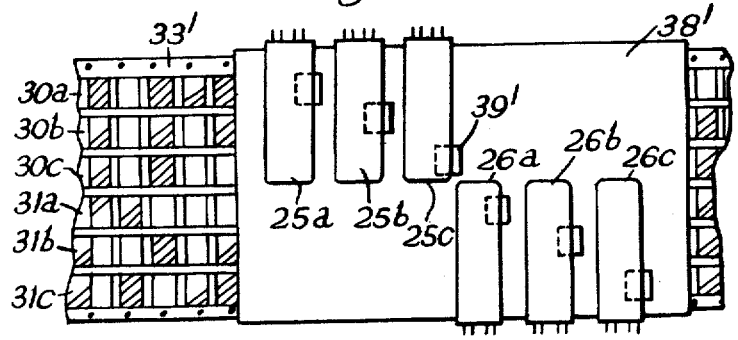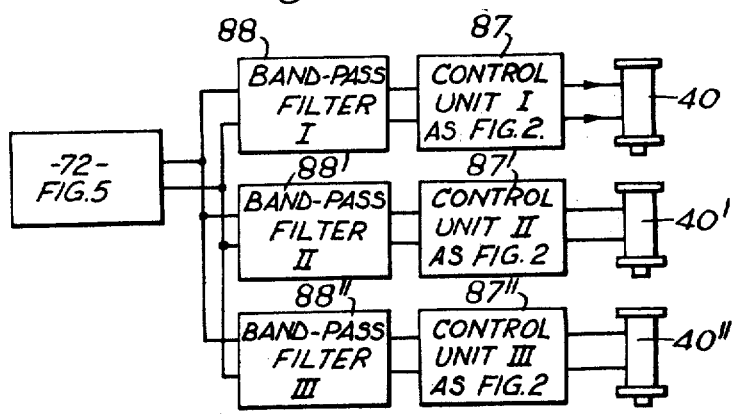

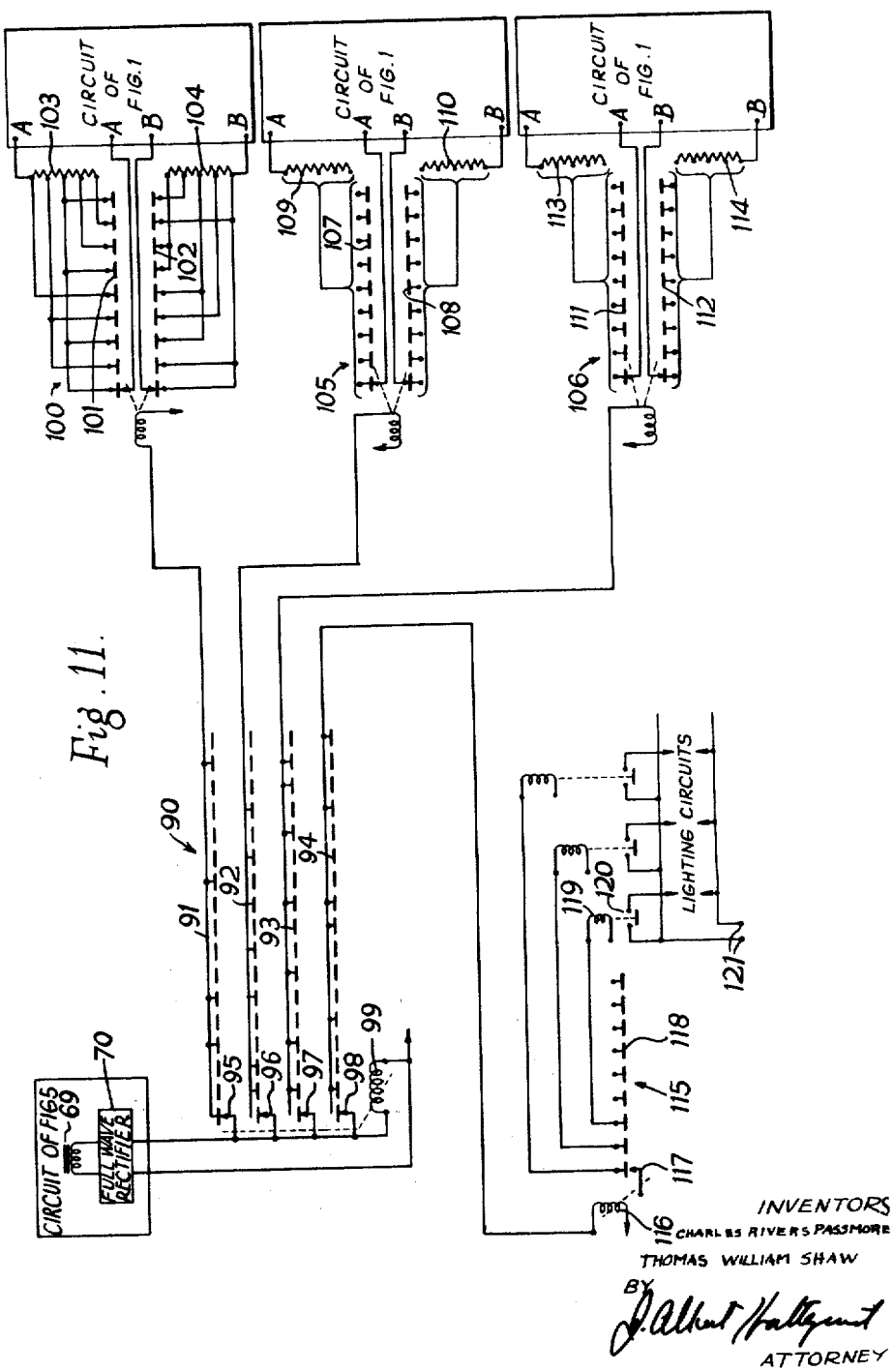

United States Patent Office 3,157,821
Patented Nov. 17, 1964

3,157,821
CONTROL OF LIGHTING EFFECTS
Charles Rivers Passmore and Thomas William Shaw, both of London, England, assignors to Thorn Electrical Industries Limited, London, England, a British company
Filed Mar. 11, 1960, Ser. No. 31,506
Claims priority, application Great Britain Mar. 13, 1959
15 Claims. (Cl. 315—155)

The present invention relates to the control of lighting effects, for example in theatres, for pageants, or in association with sound effects in displays such as are known as "Son et Lumiere" or "Aurama."

According to the present invention there is provided lighting control apparatus including a lamp and control means for the lamp including first and second variable impedance elements connected to control respectively the magnitude of the current supplied to the lamp and the rate of change of the said current from one magnitude to another, and operating means coupled to the variable impedance elements and adapted to vary their impedances stepwise in a predetermined sequence whereby the brightness of the lamp can be changed in a desired manner.

The lamp may be arranged to vary the light falling on a photo-conductive device in the feed circuit of one or more sources of illumination to be controlled, whereby changes in the resistance of the photo-conductive device effect changes in the current fed to the sources of illumination corresponding to the variations in the impedances of the variable impedance elements.

Preferably the said source or sources of illumination are arranged to be operated from alternating current and the said photo-conductive device is arranged to vary the amplitude and phase of a voltage applied between the grid and cathode of a gas-filled discharge tube relative to the voltage between the anode and cathode of the discharge tube, the anode-cathode path of the discharge tube being connected in series with the sources.

The variable impedance elements may be variable resistance elements arranged to control respectively the magnitude of the bias to be applied to the control electrode of a valve connected in series with the lamp and the rate at which changes in this bias take place in response to changes in the first variable resistance element. These variable resistance elements may be variable resistors the sequence of changes in resistance of which are pre-set by the wiring of pairs of corresponding contacts on a stepping switch to selected tappings on the two resistors. Alternatively each variable resistance element may be a photo-conductive element associated with a control element for varying the light falling on it. The control element can be moved across the photo-conductive element by appropriate drive means and has light-transmission characteristics varying in the direction of motion.

The said control element is conveniently a film or paper strip, whose transparency is varied as required in order to obtain a desired programme of changes of light intensity from the said source or sources of illumination. The element may, however, operate by reflected instead of by transmitted light if preferred.

The control element may be moved continuously. For instance when light changes are required to accompany sound reproduction the control element may be a track alongside that of a magnetic or photographic sound record. Alternatively a separate film or tape constituting the control element may be run synchronously with the sound record.

Each of a number of different sources or groups of sources of illumination may be controlled by a separate apparatus according to the invention, each being controlled by a separate control element. However a number of different programmes of control may be carried upon the same control element and may be recorded on the control element as oscillations of a number of different frequencies each modulated as required by a different programme. Each source or group of sources of illumination then has for its control a separate photo-conductive device, arranged to control its intensity and the different photoconductive devices are arranged to be responsive to different frequencies.

The control element may be moved in steps and the movements may be rapid so that the effective control takes place while the element is at rest. The movements may be initiated under the automatic control of suitable markings upon a film or tape which may, for example, also carry a sound record or the movements may be initiated manually, for instance by operating a press button switch.

The invention will now be described, by way of example, with reference to the accompanying drawings in which—

Figure 5:
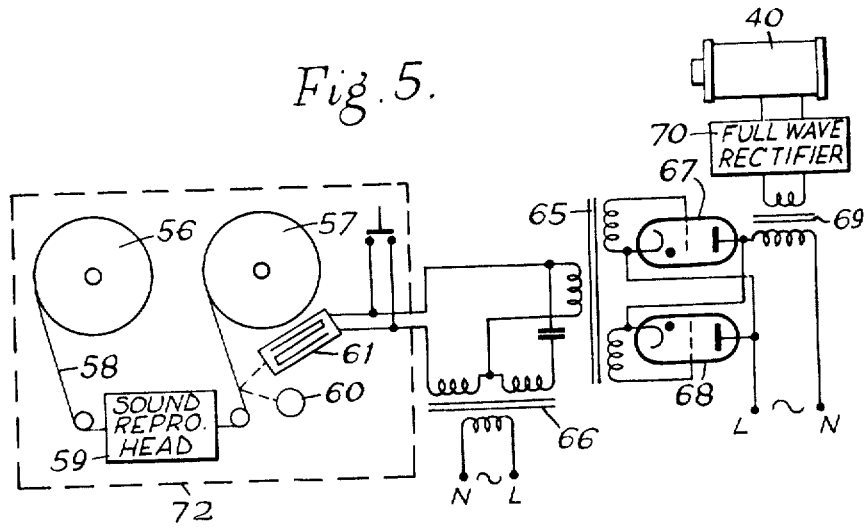
Figure 6:
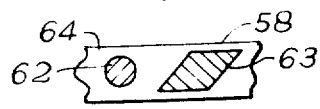

FIG. 1 is a circuit diagram of one embodiment,

FIG. 2 is a diagrammatic view in elevation of parts of the embodiment of FIG. 1, FIG. 3 is a plan view of the parts shown in FIG. 2, FIG. 4 shows a modification of a part of FIG. 1, FIG. 5 shows one way of operating the electromagnet in FIG. 1, FIG. 6 is a plan view of a fragment of the control tape used in FIG. 5, FIG. 7 shows a modification of a part of FIG. 5, FIG. 8 shows one way of using apparatus according to FIG. 5 to control a number of separate sources of illumination, FIG. 9 shows a modification of FIG. 3 for use in conjunction with the apparatus of FIG. 8, FIG. 10 shows an alternative to FIG. 8 for use in controlling a number of separate sources of illumination, and FIG. 11 is a circuit diagram of a second embodiment.

Referring first to FIG. 1, the source of illumination is represented in this example by a filament lamp 10 and a fluorescent electric discharge lamp 11 which are fed from an alternating current supply connected at N and L. Two thyratrons 12 and 13 are connected as shown with their discharge paths in parallel with one another and in series in the supply from L to the lamps 10 and 11. An alternating voltage is applied between the grid and cathode of each thyratron by a transformer 14 and the phase and amplitude of this voltage is varied by means of a bridge circuit having the two parts 15 and 16 of the secondary winding of a transformer 17 forming two of the arms, a reactance 18 forming the third arm and a photoconductive device 19, for example a cadmium sulphide cell, forming the fourth arm. The reactance 18 is shown as a capacitor but may be an inductor or a complex impedance. The primary winding 20 of the transformer 14 constitutes a diagonal of the bridge.

Variation of the amplitude and phase of the voltage applied to the grid circuits of the thyratrons 12 and 13 is effected by varying the effective resistance of the cell 19 by means of an exciter lamp 21, light from which is arranged to fall upon the cell 19. The lamp 21 is arranged in series between the supply terminal L and the anode of a hard triode 22 having in its cathode circuit a resistor 23 chosen to limit suitably the maximum current in the lamp 21.

In the grid circuit of the valve 22 is connected an electrolytic capacitor 24 having connected in parallel therewith two photoconductive devices 25 and 26 connected in series. The device 26 is connected in series with a resistor 27 across a D.C. source connected at terminals 28. The resistor 27 and device 26 thus constitute a potential divider and variations in the resistance of the device 26 produce variations in the negative bias voltage applied to the grid of the valve 22.

A lamp 29 maintained at a constant brightness is arranged to illuminate the devices 25 and 26 through separate control elements 30 and 31 each of which is provided with suitable markings according to the programme of light changes required from the sources 10 and 11, these markings determining the amount of light that is allowed to reach the associated device 25 or 26. The control elements 30 and 31 are arranged to be moved past the devices 25 and 26 and may be mounted upon a common carrier. The control element 31 controls the brightness of the sources 10 and 11 while the element 30 controls the rate at which changes in brightness occur.

Thus, when the element 31 is completely opaque, the resistance of the device 26 is very high and substantially the full negative bias, say 20 volts, is applied to the grid of valve 22. This valve is therefore cut off and the lamp 21 is not lit. Under these conditions it is arranged that the sources 10 and 11 are not operative. As the opacity of the element 31 is progressively decreased, the negative bias on the grid of valve 22 decreases and the sources 10 and 11 are first made operative and then their intensity is progressively increased.

A resistor 32 is connected in parallel with the device 25 in order to limit the maximum value of the resistance in series in the grid circuit to a suitable value. When the element 30 is completely opaque, the time constant of the circuit comprising the capacitor 24 and the parallel combination of 25 and 32 is a maximum. The effect of this is that when the opacity of the element 30 is changed the time taken for the corresponding change in intensity of the source 10, 11 to become effective is a maximum. As the opacity of the element 30 is decreased there is a corresponding decrease in the time for the changes in intensity to become effective.

In a modification of the circuit of FIG. 1 shown in FIG. 4, the electrolytic capacitor 24' is connected between the control grid of the valve 22 and the negative terminal of the source connected at 28 or, as shown, a variable tapping on a potential divider 54 connected across the source. A high resistor 55 is connected in parallel with the cell 26; for instance when the resistor 27 is of 2000 ohms the said high resistor may be 100,000 ohms. The resistor 23 is omitted. The capacitor 24' then discharges while the intensity is increasing and vice versa.

One way in which the control elements 30 and 31 may be constituted and moved will be described with reference to FIGS. 2 and 3. An endless film or paper strip 33 having sprocket holes along its edges is arranged to run between two sprockets 34 and 35 mounted for rotation about spindles 36 and 37 respectively. The sprocket 35 is toothed and the sprocket 34 is plain. The strip passes over a platform 38 having an aperture 39 extending over nearly the full width of the strip. The lamp 29, already described with reference to FIG. 1, is arranged beneath the platform opposite the aperture 39 and the photoconductive cells 25 and 26, also described previously, are arranged above the aperture. The cells 25 and 26 co-operate with two separate tracks 30 and 31 on the strip 33, these tracks constituting the control elements.

An electromagnet 40 has an armature 41 pivoted at 42 and having fixed thereto an arm 43 held against a stop 44 by means of a spring 45. A pawl 46 is fixed to the arm 43 by a blade spring 47, the pawl co-operating with a ratchet wheel 48 fixed to the spindle 37. Whenever the electromagnet 40 is energised, the arm is urged in the direction of arrow 49 to engage a stop 50, the pawl riding over one tooth of the ratchet wheel 48. When the energisation of the electromagnet 40 creases, the arm 43 is drawn by the spring 45 back to the stop 44 and the pawl 46, engaging the ratchet wheel 48, turns the sprocket 35 through one tooth pitch in the direction of the arrow 51. Thus each time the electromagnet 40 is energised, the strip 33 is moved one tooth pitch in the direction of arrow 51.

One way in which the electromagnet 40 of FIG. 2 may be operated is shown in FIG. 5. In FIG. 5 there is shown a conventional magnetic tape sound reproducer comprising take-off and take-up reels 56 and 57 between which a magnetic tape 58 bearing a sound record is passed, the tape traversing a reproducing head 59. On the back of the tape, that is the side opposite to that bearing the magnetic material, is arranged a lamp 60 and a photoconductive cell 61, light from the lamp being reflected by the surface of the tape into the cell 61. As shown in FIG. 6 the back of the tape may have cue markings such as shown at 62 or 63 of high light reflecting power compared with the surface 64, these markings being provided in regions where operation of the electromagnet 40 is required. The markings 62 and 63 may be formed by pieces of very thin white adhesive tape.

The cell 61 constitutes a variable resistance in series with the primary winding of a transformer 65 and the secondary winding of a supply transformer 66 connected in a manner similar to that described with reference to FIG. 1 to control the triggering of two A.C.-operated thyratrons 67, 68. The alternating voltage generated in the primary winding of a step-down transformer 69 when the thyratrons are triggered, which is arranged in this example to be when a highly reflecting cue marking 62 or 63 of FIG. 6 is in the light path between 60 and 61, is rectified by a full-wave rectifier 70 and the unidirectional pulse of current so produced is fed to the electromagnet 40.

The cue markings 62 and 63 may of course take other forms, such as electrically conducting areas arranged to close an electric circuit.

The cue markings are arranged suitably in relation to the sound recorded upon the tape 58 so as to cause the advance of the programming strip 33 in FIG. 1 at desired instants in relation to the sound.

A manually operable switch 71 is provided by means of which the electromagnet 40 can be energised, if required, independently of the tape 58.

A modification of a part of FIG. 5 is shown in FIG. 7, the part of FIG. 5 within the dotted rectangle 72 being represented in FIG. 7 by a block 72. In FIG. 7 a cold cathode trigger tube 73 is supplied with direct current through a rectifier 74. Stabilising tubes 75 and 76 together with a resistor 77 provide a stable direct voltage in the trigger circuit of the tube 73. The trigger circuit comprises a potentiometer, one arm of which is the photoconductive cell 61 (FIG. 5) and the other arm of which is constituted by resistors 78 and 79 in series. The resistor 78 is so adjusted that the trigger tube 73 cannot fire while the cell 61 is receiving light ony from regions of the back of the tape on which there are no markings (62, 63, FIG. 6). When a cue marking passes through the light path, the potential of point 80 rises and the tube 73 fires. A condenser 81, previously charged through the rectifier 74 and a resistor 82 then discharges through the winding of a relay A/1 whose contact $A_1$ momentarily closes the circuit of the primary winding of a transformer 69, which is connected to the electromagnet 40 as in FIG. 5. The values of 81 and 82 are so chosen that the tube 73 is extinguished and the condenser 81 is recharged before another cue marking comes into operation.

The control elements 30 and 31, as shown in FIG. 3, each have a number of separate frames, the opacity of each having the required value. Although the opacity may be uniform over the frame, preferably, as shown, the desired differences in opacity are produced by differences in the areas of the frames which are rendered opaque.

In constructing a control element the opaque areas may be defined by pieces of opaque paper or other adhesive tape stuck on to a transparent carrier. Copies of such a "master" can then be produced photographically. The "master" could itself be produced photographically by arranging to record the changes in illumination effected during manual control of the sources of illumination.

The control elements are advanced by one frame at each actuation of the electromagnet 40.

For some purposes, such for example as "Aurama" or "Son et Lumiere," although many dimmer units such as that shown in FIG. 1 may be required, a substantial proportion of this number may be called upon to operate only very occasionally. A simplification of the apparatus can then be achieved as follows.

It will be assumed that colour changes as well as changes in intensity and timing are required and that each lighting group is controlled by three dimmer units, one for each of three colours and each as shown in FIG. 1. As shown in FIG. 9, a control tape 33' having six control tracks is provided for each group. The tracks 30a, 30b and 30c control respectively the brightness of lamps of three different colours, say red, green and blue, and the tracks 31a, 31b and 31c control respectively the rates of change of the brightness. The platform 38' is provided with six apertures 39', one arranged to lie under each of the six tracks. The apertures may as shown lie on a line inclined at a suitable acute angle to the centre line of the tape. A separate photoconductive cell, 25a, 25b, 25c, 26a, 26b, 26c, is arranged on one side of each of the apertures and a light source (not shown) on the other side. Each of the three pairs of cells such as 25a and 26a is connected as shown in FIG. 1 to control the brightness and rate of change of brightness of lamps, such as 10 and 11, of one of the three colours.

Referring now to FIG. 8, change signals in the form of pulses are generated at the output of a full wave rectifier 70 from cue markings on a tape sound record as described with reference to FIG. 5. Only the secondary winding of the transformer 69 and the rectifier 70 are shown in FIG. 8, the remainder of the block being as in FIG. 5.

The change signals are applied to the moving contacts 83 of a "Uniselector" stepping switch 84 and also to the operating coil 85 of the Uniselector. The three banks are connected respectively to the electromagnets 40, 40' and 40" of control units each of which is as shown in FIG. 2, and has a control tape 33' as shown in FIG. 9. The required routing of the change signals is pre-set by making appropriate connections of the tongue contacts 86.

In operation, each change signal from 70 energises the winding 85 and steps the Uniselector forward by one step, the signal also being passed through any of the tongue contacts 86 that may be connected to the corresponding control unit 87, 87' or 87". In this way each control tape 33' needs to be provided only with a number of markings equal to the number of lighting changes required from the group with which it is associated.

It will be understood that the Uniselector may have more than three banks each controlling a different control unit 87. Moreover a number of Uniselectors may be connected in cascade, the second commencing to operate when the first has covered all its steps. Each Uniselector may have any convenient number of steps.

Another way in which change signals from the tape 58 of FIG. 5 can be routed selectively to a number of different illumination control units is illustrated in FIG. 10 In this case the tape 58, instead of carrying markings, such as 62, 63 in FIG. 6, carries on one track or on different tracks recorded oscillations of different frequency each modulated in accordance with the times at which change signals are to be sent to individual control units. A control reproduction head 89 reproduces the recorded change signals in the form of bursts of oscillation of different frequencies and these oscillations are applied to the inputs of a number of band-pass filters 88, 88', 88" each coupled to a different control unit 87, 87', 87" having its electromagnet 40, 40', 40" operating as described with reference to FIG. 2. Each bandpass filter selects from the input thereto only those bursts having a frequency within its pass band and such bursts are passed to actuate the corresponding electromagnet.

FIG. 11 shows an arrangement in which, as in that of FIG. 8, a Uniselector stepping switch is used as a master control for a group of lighting circuits, being moved one step forward on the receipt of a cueing signal such as that provided by the circuit of FIG. 5. Only the output side of the transformer 69 of the circuit of FIG. 5 is shown, together with the full wave rectifier 70, the rest of the circuit being as shown in that figure. The output from the rectifier 70 is fed not to the electromagnet 40 but to a Uniselector 90.

The master Uniselector 90 has four banks of fixed contacts 91, 92, 93 and 94 with respective moving contacts 95, 96, 97 and 98 which are moved in unison by means of a coil 99. Any of the contacts of the bank 91 can be connected to a first slave Uniselector 100 for initiating a change in the sources of illumination of one colour. The slave Uniselector 100 has two banks of contacts 101 and 102. The contacts of the banks 101 are connected to selected tappings of an associate resistor 103 and those of the bank 102 to tappings of a resistor 204. Thus as the slave Uniselector 100 is stepped forward by the receipt of control signals from the master Uniselector 90 the resistances between the terminals A—A and the terminals B—B are varied in a sequence dependent on the wiring of the contacts of the banks 101 and 102 to the tappings of the resistors 103 and 104 respectively.

The slave uniselector 100 and the resistors 103 and 104 take the place of the photoconductive devices 25 and 26 with their control elements 30 and 31 and lamp 24 and the terminals A—A and B—B of the variable resistors are connected to the points in the circuit of FIG. 1 having the same reference letters. Thus in this case the sequence of lighting changes is determined not by light-transmission characteristics of a control element but by the initial wiring of the contacts of a Uniselector stepping switch. The wiring of the contacts of the Uniselector 100 to the tappings of the resistors 103 and 104 has been indicated by way of example. It will be noted that each contact represents a change of illumination since control signals are only received from the bank 91 of the master Uniselector 90 when a change is required.

The banks 92 and 93 of the master Uniselector 90 are associated with respective slave Uniselectors 105 and 106 in the same way that the bank 91 is associated with the slave Uniselector 100. The slave Uniselector 105, which controls the sources of illumination for a second colour, has two banks of contacts 107 and 108 connected to respective tapped resistors 109 and 110, the connections not being shown in detail since they vary according to the lighting changes required. The slave Uniselector 106 has banks 111 and 112 connected to tapped resistors 113 and 114 and controls the sources of illumination of a third colour.

The fourth bank of contacts 94 of the Uniselector 90 is connected to a stepping switch 115 having an operating coil 116 controlling a moving contact 117 moving over a row of fixed contacts 118. Each of the fixed contacts 118 is connected to a relay winding such as 119 which controls a switch 120 in a lighting circuit connected in parallel with other lighting circuits across supply terminals 121. Thus the stepping switch 115 provides for the control of lighting circuits which have only to be switched in and out and for which no control over intensity or rate of change is required,

We claim:

1. Lighting control apparatus including a lamp, a source of energising current for the lamp, means coupling the source to the lamp, said coupling means comprising a first variable impedance element for controlling the magnitude of the current through the lamp and a second variable impedance element for controlling the rate of change of the said current from one magnitude to another, operating means coupled to the variable impedance elements to vary their impedances stepwise in a predetermined sequence, whereby the brightness of the lamp is changed in accordance with a predetermined programme, a group of sources of illumination to be controlled, an energising source for said illumination sources, and means connecting said illumination sources to said energising source, said connecting means including a photoconductive device co-operatively disposed with respect to said lamp for illumination thereby, whereby the illumination sources are energised in accordance with the variations in brightness of the lamp, the photoconductive device being connected in one arm of a bridge circuit including a reactance element forming a second arm of said bridge circuit, a centre-tapped secondary winding of an energising transformer forming third and fourth arms of said bridge circuit, a primary winding of a coupling transformer connected between the tap of the said secondary winding and the junction of the photocell and the reactance element to form the diagonal of the said bridge circuit, two thyratrons connected in parallel and in opposite senses in the feed circuit to the group of sources of illumination, and two secondary windings of said coupling transformer connected one in each of the grid-cathode circuits of said thyratrons.

2. Apparatus as claimed in claim 1 in which the first and second variable impedance elements are variable resistance elements and are arranged to control respectively the magnitude of the bias potential to be applied to a control electrode of a valve connected in series with the lamp and the rate at which this bias can be changed, and in which the valve is an electron discharge valve having an anode and a cathode, the lamp being connected in the anode circuit of the valve, the first variable resistance element is connected in series with a resistor to form a potentiometer arrangement for connection across a source of bias potential, the second variable resistance element is connected between the control electrode of the valve and the junction of the first variable resistance element with the resistor, and a capacitor is connected between the control electrode and the cathode of the valve, and in which the variable resistance elements are photoconductive elements and the said operating means are constituted by at least one light source arranged to illuminate the two photoconductive elements and means for driving a first control element across the light path between the first photoconductive element and the associated light source and a second control element across the light path between the second photoconductive element and the associated light source to vary the light falling on the two photoconductive elements in accordance with a predetermined sequence.

3. Apparatus as claimed in claim 2 including first and second control elements in the form of strips having light-transmission properties varying in steps along the length of the strip and means for driving the strips intermittently.

4. Apparatus as claimed in claim 3 in which the two control strips are joined together to form a band.

5. Apparatus as claimed in claim 3 in which said driving means includes a sprocket wheel with projections engaging perforations in the strip, a ratchet wheel coupled to drive the sprocket wheel, and a pawl arranged to be operable electromagnetically in response to operating signals to move the ratchet wheel forward in steps.

6. Apparatus as claimed in claim 1 in which the variable impedance elements are first and second tapped resistors with their tappings connected to the fixed contacts of first and second stepping switches respectively, the first and second stepping switches being operable in response to received operating signals to initiate lighting changes.

7. Apparatus as claimed in claim 6 in which the operating signals are generated in response to changes in the light falling on a photocell caused by movement of a cueing strip in synchronism with a record of effects to be reproduced in conjunction with the lighting changes.

8. Apparatus as claimed in claim 7 in which the cueing strip is combined with a sound record strip.

9. Apparatus as claimed in claim 8 in which the cueing strip comprises reflecting areas affixed to the back of the sound record strip and a lamp is arranged to direct light reflected from the reflecting areas on to the photocell.

10. Apparatus as claimed in claim 7 in which the photocell is connected in one arm of a bridge circuit, a second arm of which is formed by a reactance element, the third and fourth arms of which are formed by a centre-tapped secondary winding of a supply transformer, and a diagonal of which is formed by the primary winding of a coupling transformer connected between the tap of the said secondary winding and the junction of the photocell and the reactance element, the coupling transformer having two secondary windings connected in the grid-cathode circuits of respective thyratrons which are connected in parallel and in opposite senses in an output circuit.

11. Apparatus as claimed in claim 10 in which the output circuit includes an output transformer with its primary winding in series with the parallel combination of thyratrons and a rectifier connected to the secondary winding of the output transformer, the operating signals being generated as unidirectional pulses at the output of the rectifier in response to changes in the balance of the bridge due to illumination of the photocell by reflected light.

12. Apparatus as claimed in claim 7 in which the photocell forms one section of a potentiometer arrangement for controlling the bias applied to a trigger electrode of a trigger tube, a relay being connected in the anode circuit of the trigger tube and arranged to operate a switch in a supply circuit to generate the operating signals.

13. Apparatus as claimed in claim 12 including an output transformer having a primary winding connected in series with the switch in the supply circuit and a secondary winding connected to a rectifier, the operating signals being generated as unidirectional pulses at the output of the rectifier.

14. Apparatus as claimed in claim 5 for the control of a plurality of lamps or groups of sources of illumination in which the operating signals are distributed to the control means for the several lamps through a master stepping switch having a number of banks of fixed contacts with respective moving contacts, the moving contacts being movable in unison by received signals, and selected contacts in each bank being connected through a common output line to one of the said control means to operate this control means at selected stages in the movement of the moving contacts of the master stepping switch.

15. Apparatus as claimed in claim 5 for the control of a plurality of lamps and groups of sources of illumination, in which the operating signals for the control means of the several lamps are derived from signals of different frequencies magnetically recorded on a carrier, the carrier being, in operation, moved in synchronism with the reproduction of a record of sound or other effects, the apparatus including a magnetic recording head for reproduction of the recorded signals from the tape and parallel circuits connected between the reproducing head and the several control means and each comprising a band-pass filter adapted to select signals at one of the recorded frequencies for application to the associated control means.

References Cited in the file of this patent

UNITED STATES PATENTS

| | | |
|---|---|---|
| 1,939,243 | Twyman | Dec. 12, 1933 |
| 1,953,072 | Casper | Apr. 3, 1934 |
| 2,632,855 | Bendz | Mar. 24, 1953 |
| 2,779,897 | Ellis | Jan. 29, 1957 |

FOREIGN PATENTS

| | | |
|---|---|---|
| 216,572 | Australia | Aug. 6, 1958 |